(12) United States Patent
Courchaine et al.

(10) Patent No.: US 11,243,366 B2
(45) Date of Patent: Feb. 8, 2022

(54) RACK ROUTING GUIDE

(71) Applicant: AFL Telecommunications LLC, Duncan, SC (US)

(72) Inventors: Wilfred Courchaine, Moore, SC (US); Mark Vogel, Greenville, SC (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 0 days.

(21) Appl. No.: 16/868,098

(22) Filed: May 6, 2020

(65) Prior Publication Data

US 2021/0181445 A1    Jun. 17, 2021

Related U.S. Application Data

(60) Provisional application No. 62/948,574, filed on Dec. 16, 2019.

(51) Int. Cl.
 *G02B 6/00* (2006.01)
 *G02B 6/44* (2006.01)

(52) U.S. Cl.
 CPC ......... *G02B 6/4452* (2013.01); *G02B 6/4459* (2013.01)

(58) Field of Classification Search
 CPC ....... G02B 6/4452; G02B 6/4459; G02B 6/00
 See application file for complete search history.

(56) References Cited

U.S. PATENT DOCUMENTS

| 5,100,221 | A | 3/1992 | Carney |
| 8,452,148 | B2 | 5/2013 | Cooke |
| 8,965,168 | B2 | 2/2015 | Cowen |
| 9,389,384 | B2 * | 7/2016 | Solheid ............... G02B 6/4452 |
| 9,500,830 | B2 * | 11/2016 | Lu ....................... G02B 6/2558 |
| 10,488,612 | B2 * | 11/2019 | Gonzalez Covarrubias ............... G02B 6/4453 |
| 2011/0085776 | A1 | 4/2011 | Biribuze |
| 2018/0081139 | A1 * | 3/2018 | Geens ................. G02B 6/4471 |

OTHER PUBLICATIONS

International Patent Application No. PCT/CN2020/061416; International Search Report; dated Feb. 25, 2021; (2 pages).

* cited by examiner

*Primary Examiner* — Jennifer Doan
(74) *Attorney, Agent, or Firm* — Dority & Manning, P.A.

(57) ABSTRACT

A rack routing guide installable in an equipment rack, the rack routing guide comprising: a body defining a volume configured to route one or more optical fibers from fiber optic equipment disposed in the equipment rack, wherein a lateral sidewall of the body includes an opening through which the one or more optical fibers are receivable into the volume; and a mount configured to couple the body to the equipment rack.

18 Claims, 7 Drawing Sheets

RACK ROUTING GUIDE

CROSS-REFERENCE TO RELATED APPLICATIONS

This application is based upon and claims the benefit of priority to U.S. Provisional Application No. 62/948,574 having a filing date of Dec. 16, 2019, the disclosure of which is incorporated by reference herein in its entirety.

FIELD

The present disclosure relates generally to rack routing guides, and more particularly to rack routing guides for routing optical fibers in fiber optic equipment racks.

BACKGROUND

Fiber optic equipment racks typically include a number of enclosures mounted along vertical rails. Each enclosure includes one or more fiber optic modules typically mounted on adjustable tray(s) which slide relative to the equipment rack. Optical fibers are connected to the fiber optic modules and typically extend down the side of the equipment racks and branch off to different termination points within the building.

During initial installation and maintenance of the enclosures, the adjustable trays are slid relative to the equipment rack to allow the technician access to the fiber optic modules. During such time, the optical fibers connected to the fiber optic modules bend and move to accommodate movement of the tray.

Traditionally, the optical fibers extending from the cassette are either loose or tethered together through a wrap or band. However, such arrangement may lead to entangled optical fibers which can damage the cores of the optical fibers and/or increase difficulty to the on-site technician. Accordingly, improved systems and methods of routing optical fibers at equipment racks are desired.

BRIEF DESCRIPTION

Aspects and advantages of the systems and methods in accordance with the present disclosure will be set forth in part in the following description, or may be obvious from the description, or may be learned through practice of the technology.

In accordance with one embodiment, a rack routing guide is provided. The rack routing guide includes a body defining a volume configured to route one or more optical fibers from fiber optic equipment. A lateral wall of the body includes an opening through which one or more optical fibers are receivable into the volume. The rack routing guide further includes a mount configured to couple the body to the equipment rack.

In accordance with another embodiment, a rack routing guide system is provided. The rack routing guide system includes a first rack routing guide and a second rack routing guide. The first rack routing guide includes a body defining a volume configured to route one or more optical fibers from fiber optic equipment at a first elevation, wherein a lateral wall of the body includes an opening through which the one or more optical fibers at the first elevation are receivable into the volume. The second rack routing guide includes a body defining a volume configured to route one or more optical fibers from fiber optic equipment at a second elevation different from the first elevation, wherein a lateral wall of the body includes an opening through which the one or more optical fibers at the second elevation are receivable into the volume. The rack routing guide system further includes a mount configured to couple at least one of the first rack routing guide and the second rack routing guide to the equipment rack.

In accordance with another embodiment, a method of routing optical fibers on an equipment rack includes moving the optical fibers to a side of a rack routing guide, the rack routing guide being mounted to the equipment rack, and moving the optical fibers into a volume defined by a body of the rack routing guide by passing the optical fibers through an opening in a lateral sidewall of the body.

These and other features, aspects and advantages of the present systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present systems and methods, including the best mode of making and using the present systems and methods, directed to one of ordinary skill in the art, is set forth in the specification, which makes reference to the appended figures, in which.

DETAILED DESCRIPTION

Figure 1:
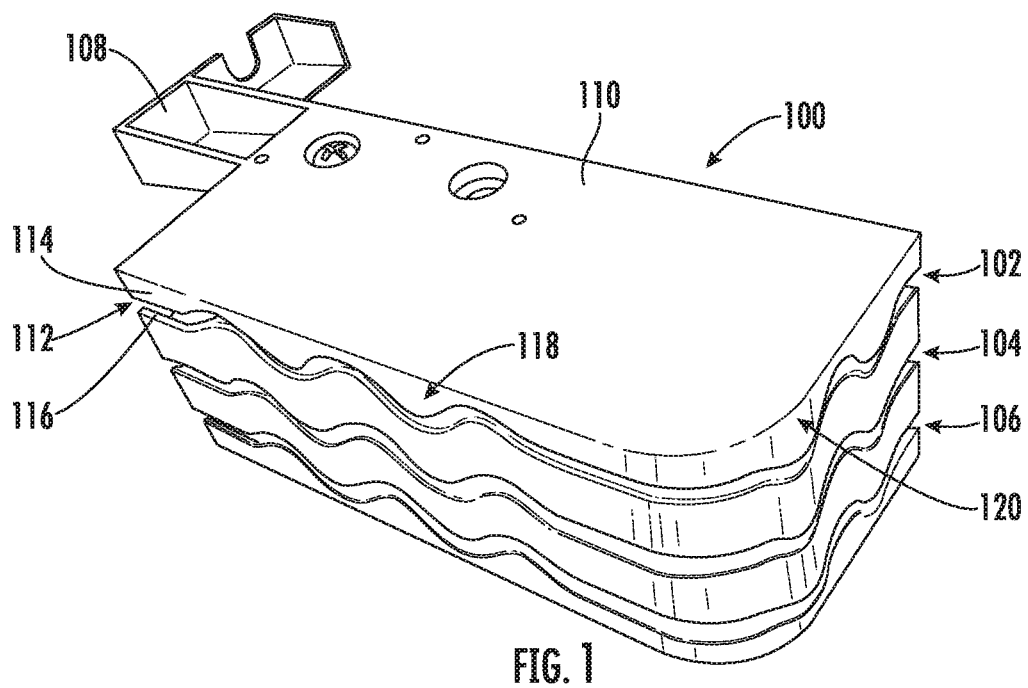
FIG. 1 illustrates a perspective view of a rack routing guide system in accordance with embodiments of the present disclosure.

Reference now will be made in detail to embodiments of the present systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 5:
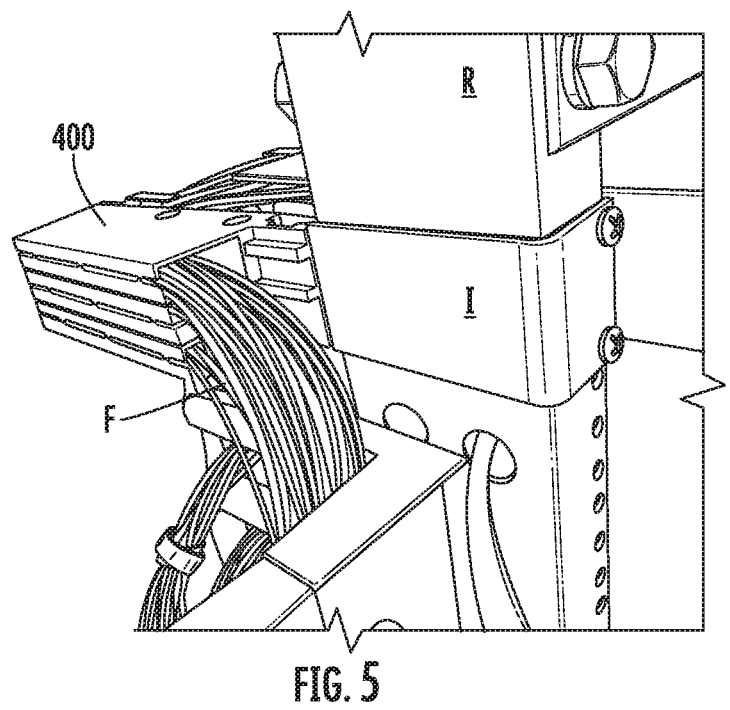
FIG. 5 illustrates a rear perspective view of a rack routing guide system mounted to an equipment rack in accordance with embodiments of the present disclosure.

Referring now to the drawings, FIG. 1 illustrates a rack routing guide system 100 including a plurality of rack routing guides 102, 104, and 106 stacked on top of one another in a vertical configuration. In the illustrated embodiment, the rack routing guide system 100 includes three rack routing guides 102, 104, and 106. In other embodiments, the rack routing guide system 100 can include more or less rack routing guides, such as one rack routing guide, two rack routing guides, or four or more rack routing guides. The rack routing guides can alternatively be staggered, laterally offset, in one or more columns, or arranged in other spatial configurations. The rack routing guide system 100 can further include a mount 108 configured to couple at least one of the plurality of rack routing guides 102, 104, and 106 to an equipment rack R (FIG. 5). The equipment rack R can be, for example, associated with a fiber optic equipment storage space. In an embodiment, the mount 108 may be directly attached to the equipment rack R. As described in greater detail hereinafter, in another embodiment, the mount 108 may attach to the equipment rack R through one or more intermediate members I. The mount 108, and optionally the intermediate member I, may facilitate a fixed spatial arrangement between the rack routing guide system 100 and the equipment rack R.

The rack routing guide system 100 can be installable on the equipment rack R and used to route optical fibers F (FIG. 5) to reduce entanglement thereof, facilitate easier installation and maintenance of optical fibers F, and reduce damage incurred by the optical fibers F as they are bent and moved.

Reference below to rack routing guide 102 is intended to refer to rack routing guide 102 alone and/or in combination with any number of the other rack routing guides, e.g., rack routing guides 104 and 106, included in the rack routing guide system 100.

The rack routing guide 102 can include a body 110 defining a volume 112 configured to route one or more optical fibers F.

In an embodiment, the body 110 can include a polymeric material. Exemplary polymeric materials include, for example, acrylonitrile butadiene styrene (ABS), methyl methacrylate (MMA), epoxy resin (EP), high density polyethylene (HDPE), polyamide (PA), polyamide 6 (PA6), a polyaramid (PAR), polycarbonate (PC), polyethylene (PE), polyether sulphone (PESU), a polyimide (PI), polyoxymethylene (POM), polypropylene ethylene (PPE), polypropylene (PP), polystyrene (PS), polysulphone (PSU), polyurethane (PU), polyvinyl chloride (PVC), and/or a thermoplastic elastomer (TPE). The polymeric material can also include any number of other polymeric materials and/or any combination thereof. The body 110 can further include fillers, such as glass fillers, carbon fillers, graphite fillers, mineral fillers, pigments, dyes, and other known filler materials.

In other embodiments, the body 110 can include a metal or alloy, a fibrous woven filament or composite, a ceramic, or any combination thereof. As described in greater detail hereinafter, the body 110 may be configured to deflect upon installation of one or more optical fibers F within the volume 112. In this regard, at least a portion of the body 110 of the rack routing guide 102 may be deformable or have a moveable component which allows a technician to install and remove the optical fibers F from the volume 112.

The volume 112 can be disposed within the body 110. The volume 112 can define a volumetric receiving area into which portions of optical fibers F can be positioned. In certain instances, the volume 112 can be substantially closed, i.e., defined by one or more surfaces of the body 110. In other embodiments, the volume 112 may be at least partially, such as substantially, open to an external environment while configured to guide optical fibers F. In an exemplary embodiment, the term "volume" may refer to a receiving area of the rack routing guide 102 for receiving optical fibers F without requiring that the volume 112 be fully enclosed.

Once inside of the volume 112, the optical fibers F can be protected and guided as described in greater detail herein. The body 110 of the rack routing guide 102 can include a sidewall 114 defining an opening 116 through which the one or more optical fibers F may be passed through to enter the volume 112. In an embodiment, in the installed state, i.e., when the rack routing guide 102 is installed with an equipment rack R, the opening 116 may be on an opposite side of the rack routing guide 102 as compared to the equipment rack R. That is, for example, at least a portion of the body 110 of the rack routing guide 102 can be disposed between the opening 116 and the equipment rack R. In such a manner, the technician can insert the optical fibers F into the volume 112 by applying pressure along the optical fibers F in a direction generally towards the equipment rack R. This may reduce fatigue and stress within the rack routing guide system 100.

In an embodiment, the opening 116 can define a generally linear profile as seen along the sidewall 114 of the rack routing guide 102. That is, for example, the opening 116 can lie along a straight line extending across the sidewall 114. In an embodiment, the straight line of the opening 116 can be parallel, or substantially parallel, with a major surface (e.g., a top or bottom surface) of the body 110 of the rack routing guide 102. In another embodiment, the opening 116 can have a non-linear shape, as seen along the sidewall 114. For example, by way of non-limiting example, the opening 116 can have an undulating shape, a castellated shape, a jagged shape, or another non-linear shape. The opening 116 illustrated in FIG. 1 defines a generally undulating shape. In a particular embodiment, the non-linear (e.g., undulating) shape of the opening 116 may become a linear shape at one or more locations along the length of the opening 116. For example, by way of a non-limiting embodiment, the opening 116 may have a linear (e.g., non-undulating) shape at a corner of the rack routing guide 102. As described in greater detail below, the linear shape at the corner of the rack routing guide 102 may facilitate easier installation of the optical fibers F into the volume 112 as compared to openings 116 with non-linear corners where a technician has to guide the optical fibers F along the non-linear profile at the corners. The technician may begin installation at the corner and work outward therefrom.

The opening 116 can have different shapes, dimensions, or numbers of non-linear features per side. For example, referring to FIG. 1, a first side 118 of the rack routing guide 102 can define three undulations while a second side 120 defines a single undulation. Similarly, the size, shape, or profiles of the non-linear openings one the first and second sides 118 and 120 can be different in other ways as compared to one another. The opening 116 can extend through the entire sidewall 114 of the body 110 of the rack routing guide 102.

Figure 2:
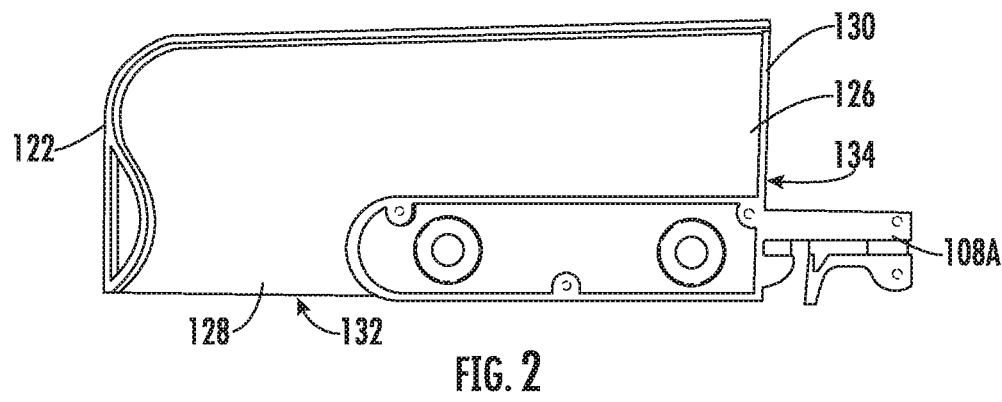
FIG. 2 illustrates a bottom view of a first component of a rack routing guide in accordance with embodiments of the present disclosure.
Figure 3:
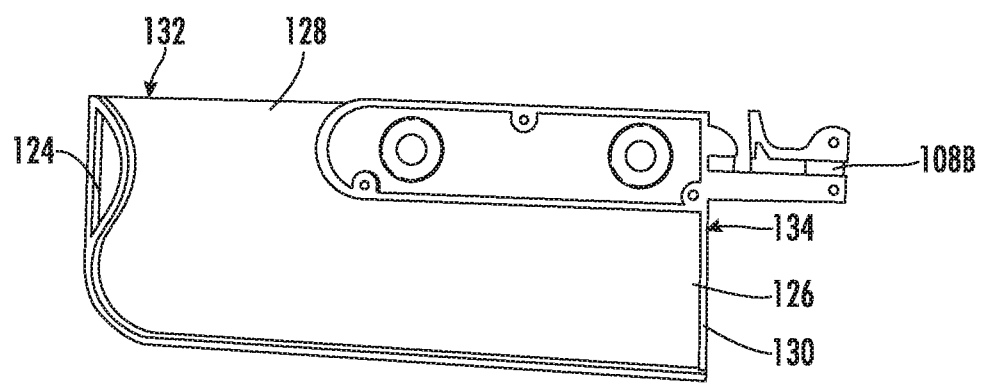
FIG. 3 illustrates a top view of a second component of a rack routing guide in accordance with embodiments of the present disclosure.

FIG. 2 illustrates a bottom view of a first component 122 of the rack routing guide 102 in accordance with an embodiment of the present disclosure. The first component 122 can include, for example, a top part of the rack routing guide 102. FIG. 3 illustrates a top view of a second component 124 of the rack routing guide 102 in accordance with an embodiment of the present disclosure. The second component 124 can include, for example, a bottom part of the rack routing guide 102. The first and second components 122 and 124 can operate in concert to define the volume 112 of the rack routing guide 102.

In an embodiment, the first and second components 122 and 124 can be substantially similar to one another, such as reflectively symmetrical, or generally reflectively symmetrical, with respect to one another. The first and second components 122 and 124 can each define a passthrough 126 which, when combined, form the volume 112. In an embodiment, the passthrough 126 of at least one of the first and second components 122 and 124 can define an open end, such as open end 128. In another embodiment, the passthrough 126 of at least one of the first and second components 122 and 124 can define two open ends, such as the open end 128 previously described and a second open end 130. Optical fibers F connected to fiber optic equipment associated with the equipment rack R can enter the passthrough 126 through the open end 128 and exit the passthrough 126 through the second open end 130.

In an embodiment, the open ends 128 and 130 can be disposed on different sides of the first and second components 122 and 124. For example, the opening 128 can be disposed on a third side 132 of the body 110 and the second opening 130 can be disposed on a fourth side 134 of the body 110. The third and fourth sides 132 and 134 can be disposed adjacent to one another. In an embodiment, the first side 118 (FIG. 1) and third side 132 can be disposed opposite one another and the second side 120 (FIG. 1) and fourth side 134 can be disposed opposite one another.

As illustrated in FIGS. 2 and 3, the mount 108 can include portions disposed on both the first component 122 and the second component 124. In the illustrated embodiment, the first component 122 includes a first portion of the mount 108A and the second component 124 includes a second portion of the mount 108B. In an embodiment, the first and second portions of the mount 108A and 108B can be joined together. For example, one of the first and second components of the mount 108A or 108B can include one or more posts receivable in one or more openings in the other of the first and second components of the mount 108A or 108B. The first and second components of the mount 108A and 108B can thus be joined together. In another embodiment, the first and second components 108A and 108B of the mount can snap together, form an interference with respect to one another, be fastened together through one or more external fasteners (e.g., threaded fasteners, non-threaded fasteners, clips, ties, or the like).

In other embodiments, the mount 108 can be disposed entirely on one of the first and second components 122 or 124. For example, the mount 108 can be disposed entirely on the first component 122 or entirely on the second component 124. Alternatively, the mount 108 can include different structures on each of the first and second components 122 and 124 which together form a single mounting structure for attaching the rack routing guide system 100 to the equipment rack R.

In a non-illustrated embodiment, the rack routing guide 102 can include a one-piece body 110 (not shown) which includes an opening 116 to permit entrance of the optical fibers F into the volume 112. In yet another non-illustrated embodiment, the rack routing guide 102 can include a multi-piece construction split into pieces different than those described above.

Figure 4:
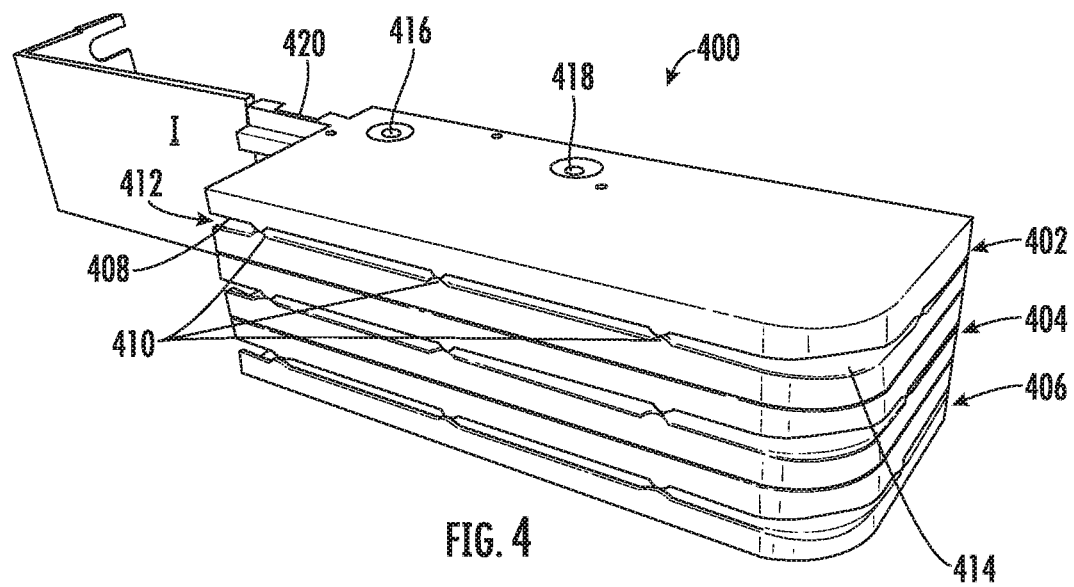
FIG. 4 illustrates a perspective view of a rack routing guide system in accordance with embodiments of the present disclosure.

FIG. 4 illustrates a perspective view of a rack routing guide system 400 in accordance with another embodiment. The rack routing guide system 400 includes rack routing guides 402, 404, and 406 having similar characteristics as compared to the rack routing guide system 100 illustrated in FIG. 1. However, unlike the opening 116 in the sidewall 114 of the rack routing guide 102, an opening 408 in the rack routing guide 402 is linear and includes retention features 410 configured to maintain optical fibers F within a volume 412 defined by the rack routing guide 402. The retention features 410 can include, for example, notches, castellations, tines, fingers, bumps, knobs, surface texture(s), deformable or non-deformable flaps, similar retention style elements configured to prevent undesired egress of optical fibers F from the volume 412, or any combination thereof. In an embodiment, the rack routing guide 402 can include at least one retention feature 410, such as at least two retention features 410, such as at least three retention features 410, such as at least four retention features 410, such as at least five retention features 410. The retention features 410 can have same, similar, or different shapes, sizes, and spatial dispositions with respect to one another. In certain instances, the retention features 410 can be equally spaced apart. In other instances, the retention features 410 can be staggered at uneven intervals.

In an embodiment, a corner 414 of the opening 408 can have an enlarged dimension to facilitate easier installation of the optical fibers F into the volume 412. For example, the corner 414 of the opening 408 can define a dimension, $D_C$, as measured perpendicular to a best fit line of the opening 408, that is greater than a dimension, $D_O$, of the opening 408 at a location spaced apart from the corner 414 in a direction parallel with $D_C$. In an embodiment, $D_C$ can be at least 1.01 $D_O$, such as at least 1.02 $D_O$, such as at least 1.03 $D_O$, such as at least 1.04 $D_O$, such as at least 1.05 $D_O$, such as at least 1.1 $D_O$, such as at least 1.15 $D_O$, such as at least 1.2 $D_O$, such as at least 1.25 $D_O$. As described in greater detail hereinafter, the greater dimension of the corner 414 can facilitate easier initial installation and alignment of the optical fiber F with respect to the opening 408. For example, an operator can initiate installation of the optical fiber F into the opening 408 at the corner 414 where the dimension of the opening 408 is greater. After aligning and partially installing the optical fiber F into the opening 408 at the corner 414, the operator can slide or otherwise adjust their fingers or installation tool along the opening 408 in a direction(s) away from the corner 414 until the optical fiber F is seated within the volume 412.

In an embodiment, the opening 408 can allow selective access of optical fibers F into the volume 412 while preventing unwanted removal of optical fibers F therefrom. The rack routing guide 402 is not intended to be limited to above-described shape or configuration illustrated in the figures.

A fastener 416 can be used to secure the rack routing guide system 400 together. The fastener 416 can extend, for example, through the rack routing guides 402, 404, and 406 interconnecting the rack routing guides 402, 404, and 406 together. In an embodiment, the fastener 416 can be a threaded fastener. In another embodiment, the fastener 416 can be a non-threaded fastener. A secondary fastener 418 can be utilized to further secure the rack routing guide system 400 together. The secondary fastener 418 can be a threaded fastener or a non-threaded fastener. In certain instances, the fastener 416 and secondary fastener 418 can be a same type of fastening element. In another instance, the fastener 416 and secondary fastener 418 can include different types of fasteners. This may allow for different properties, e.g., flexure, of the rack routing guide system 400 at different locations therealong which may facilitate easier installation of optical fibers F or installation relative to the equipment rack R.

The rack routing guide system 400 includes a mount 420 which engages with an intermediate member I to attach to the rack routing guide system 400 to an equipment rack R. By way of non-limiting example, the mount 420 of the rack routing guide system 400 can be engaged with the intermediate member I through a threaded interface, a non-threaded interface, an interference fit, a slide or bayonet type connection, a clip, a deformable engagement member, a snap fit, another fastener or interface, or any combination thereof.

Referring to FIG. 5, the intermediate member I can be attached to the equipment rack R. For example, the intermediate member I can be attached to a rear end of the equipment rack R, such as, for example, through a threaded fastener at a rear surface of the equipment rack R. The intermediate member I can extend from the rear surface of the equipment rack R along a side thereof to a front area of the equipment rack R where the rack routing guide system 400 can be attached thereto. In an embodiment, the rack routing guide system 400 can be disposed at least partially at a front area of the equipment rack R and the intermediate member I can be attached to the equipment rack R at a rear area or side area of the equipment rack R. In another embodiment, the intermediate member I can be attached to the front area of the equipment rack R.

In certain instances, the intermediate member I can be attached to the equipment rack R without the rack routing guide system 400 attached thereto. The rack routing guide system 400 can then be attached to the intermediate member I once the intermediate member I is in position with respect to the equipment rack R. In other instances, the intermediate member I can be attached to the rack routing guide system 400 prior to being attached to the equipment rack R.

In an embodiment, the rack routing guide system 400 can be rapidly removed from the intermediate member I to facilitate quick installation, service, and/or removal of the rack routing guide system 400 from the equipment rack R without requiring removal of the intermediate member I from the equipment rack R.

Figure 6:
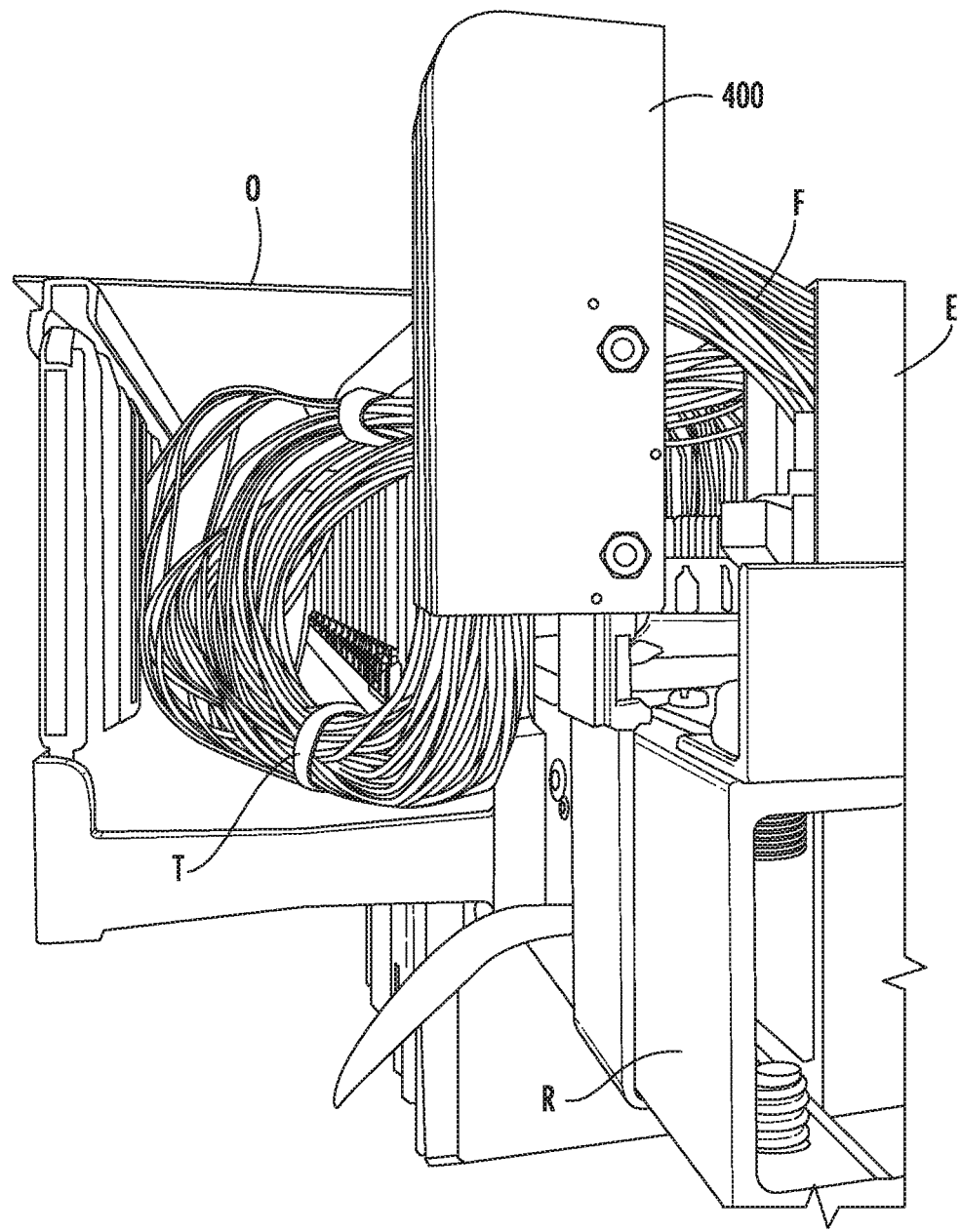
FIG. 6 illustrates a top view of a rack routing guide system mounted to an equipment rack in accordance with embodiments of the present disclosure.

FIG. 6 shows a top view of the rack routing guide system 400 attached to the equipment rack R. Optical fibers F extend from equipment E disposed in the equipment rack R, pass through the rack routing guide system 400, and extend into a vertical organizer O disposed adjacent to the equipment rack R. The optical fibers F then pass from the vertical organizer O and split to other locations where the second ends of the optical fibers F are connected to other optical fibers (not shown), adapters, or connectors to complete optical paths. As shown, the optical fibers F can be tied together by one or more ties T. In the illustrated embodiment, the ties T are coupled to the optical fibers F at locations within the vertical organizer O. In other embodiments, the ties T can be coupled to the optical fibers at other locations, such as between the vertical organizer O and the rack routing guide system 400, between the rack routing guide system 400 and the equipment E, or after passing through the vertical organizer O. In an embodiment, one or more of the ties T can be further coupled to the vertical organizer O so as to secure a bunch of optical fibers F thereto. Movement of the equipment E, e.g., sliding one or more trays associated with fiber optic modules disposed within the equipment rack R, may not affect location of the optical fibers within the vertical organizer O as the rack routing guide system 400 allows such deflection without substantially moving the optical fibers F exiting from the rack routing guide system 400. In such a manner, optical fibers F, or bunches thereof, may maintain order and alignment without becoming tangled or otherwise interwoven through repeated movement of the equipment E.

Figure 7:
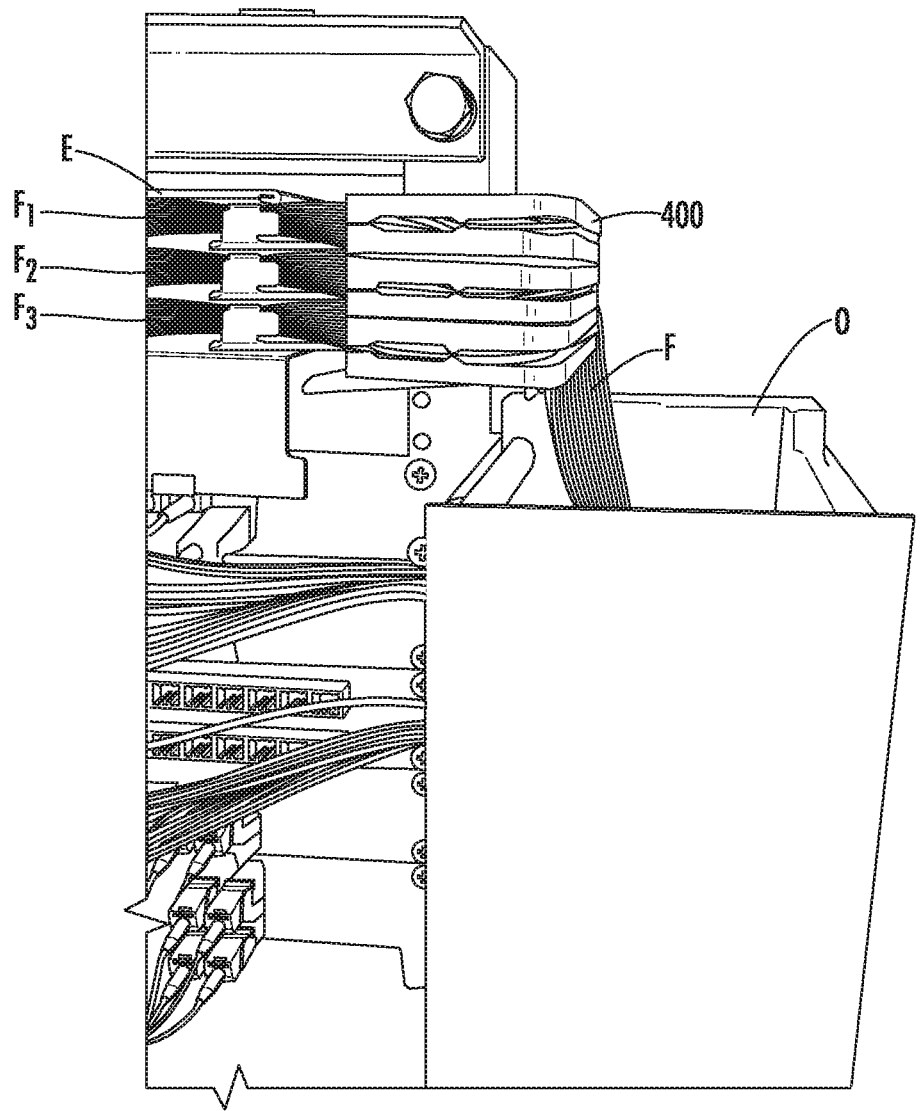
FIG. 7 illustrates a front view of a rack routing guide system mounted to an equipment rack in accordance with embodiments of the present disclosure.

FIG. 7 shows a front view of the rack routing guide system 400 attached to the equipment rack R with optical fibers F extending from equipment E contained in the equipment rack R. As shown, optical fibers F pass through the rack routing guide system 400 at generally horizontal orientations and turn to vertically descend from the rack routing guide system 400 to the vertical organizer O after passing through the rack routing guide system 400.

Equipment racks R typically support a number of equipment E, such as a plurality of patch panels, disposed vertically above one another. Each equipment E may contain a plurality of rows of equipment, such as a plurality of rows of trays each housing one or more optical fiber modules. As shown in FIG. 7, the rack routing guide system 400 can maintain the optical fibers F at the respective heights of the equipment E from which the optical fibers F are connected until the location where the optical fibers F pass through the rack routing guide system 400. By way of example, the equipment E might include three rows of trays (not illustrated) each housing one or more optical fiber modules to which the optical fibers F are attached. The trays may be slidable relative to the equipment rack R. In the embodiment shown in FIG. 7, the trays may be slidable into and out of the page between stored and extended positions.

By way of exemplary embodiment, the optical fibers F may include three groups of optical fibers $F_1$, $F_2$, and $F_3$, each extending to a different tray and connected with one or more optical fiber modules on the respective tray. The first group of optical fibers F1 may remain at a first vertical elevation, as measured between the equipment E and the rack routing guide system 400. The second group of optical fibers F2 may remain at a second vertical elevation, as measured between the equipment E and the rack routing guide system 400. The third group of optical fibers F3 may remain at a third vertical elevation, as measured between the equipment E and the rack routing guide system 400. The first, second, and third elevations may be different from one another. In an embodiment, the first, second, and third elevations may remain generally stacked in a vertical arrangement regardless of whether the equipment E, or components thereof, are in stored positions or extended positions because of the rack routing guide system 400. In such a manner, the rack routing guide system 400 can organize optical fibers F and prevent entanglement or even damage thereto.

Figure 8:
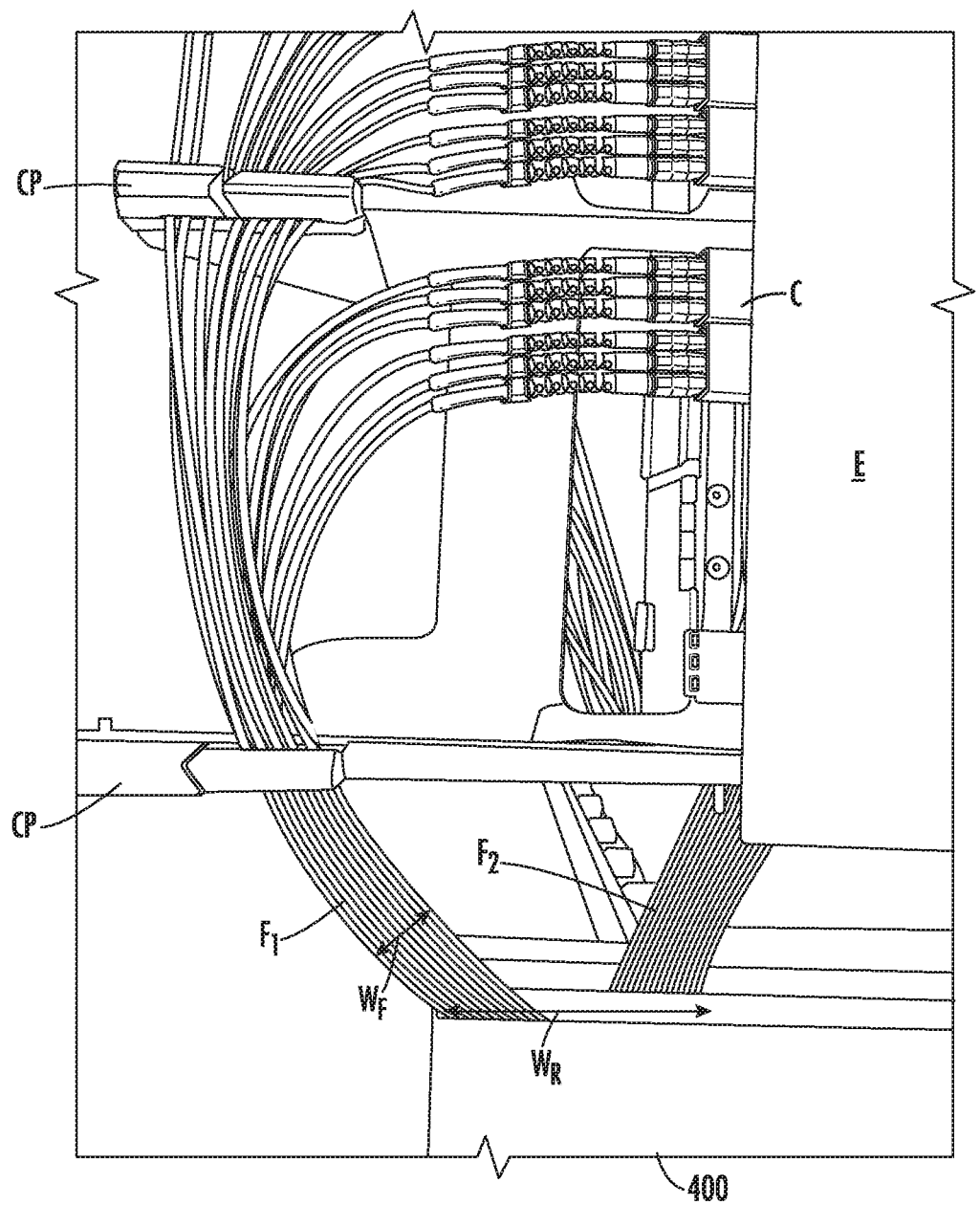
FIG. 8 illustrates a top view of optical fibers extending from a cassette of an enclosure on an equipment rack to a rack routing guide system mounted to the equipment rack in accordance with embodiments of the present disclosure.

FIG. 8 illustrates a top view of a portion of the rack routing guide system 400 with optical fibers F extending from the rack routing guide system and plugged into connectors or adapters C associated with equipment E. The optical fibers F include a first bunch of optical fibers $F_1$ and a second bunch of optical fibers $F_2$ associated with the equipment E. The equipment E associated with the first bunch of optical fibers $F_1$ is in an extended position while the equipment E associated with the second bunch of optical fibers $F_2$ is in a retracted, or stored, position. The bunches of optical fibers $F_1$ and $F_2$ remain together in groups through clipped portions CP of the equipment E and into the rack routing guide system 400. As the equipment E is adjusted, e.g., trays are moved between extended and retracted positions, the bunches of optical fibers $F_1$ and $F_2$ remain separate and unentangled.

In an embodiment, the open end 128 of the rack routing guide system 400 can define a width, $W_R$, that is greater than a width, $W_F$, of the optical fiber bunch F. For example, $W_R$ can be at least 1.01 $W_F$, such as at least 1.02 $W_F$, such as at least 1.03 $W_F$, such as at least 1.04 $W_F$, such as at least 1.05 $W_F$, such as at least 1.1 $W_F$, such as at least 1.25 $W_F$, such as at least 1.5 $W_F$. In this regard, the bunch of optical fibers F can translate within the open end 128 as the equipment E is adjusted. Use of an open end 128 having a greater dimension as compared to the optical fiber bunch F may permit the operator to adjust the equipment E without bending (e.g., kinking) the optical fibers F.

In an embodiment, the optical fibers F float relative to the rack routing guide system 400. As used herein, "float" refers to a condition whereby the optical fibers F are free to move relative to the rack routing guide system 400 while being guided thereby. For instance, the optical fibers F can translate through the rack routing guide system 400 or flex within the rack routing guide system 400 without detaching therefrom.

Figure 9:
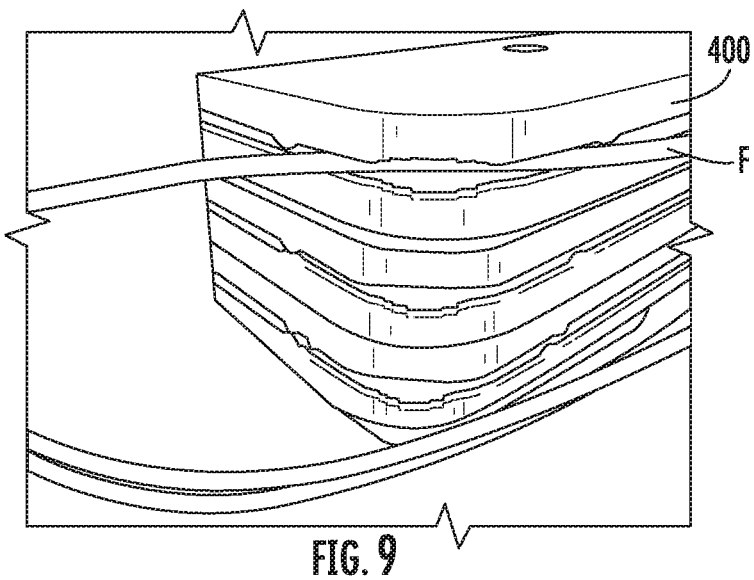
FIGS. 9 to 11 illustrate views of a technician moving optical fibers into a volume defined by the rack routing guide in accordance with embodiments of the present disclosure.
Figure 10:
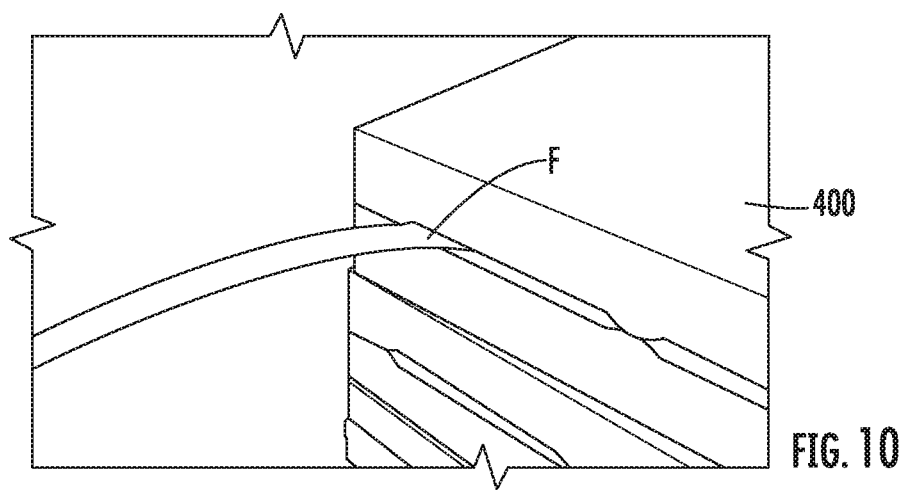
Figure 11:
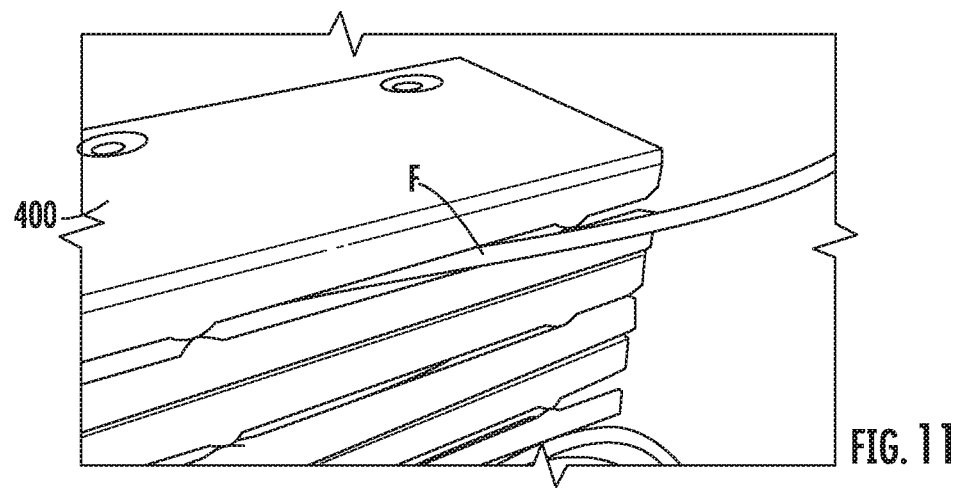

FIGS. 9 to 11 illustrate a method of routing optical fibers F on an equipment rack E. While the below method relates to the rack routing guide 400, in other embodiments, the method can be performed using the rack routing guide 100. As illustrated in FIG. 9, the method can include a step of moving the optical fibers F to a side of a rack routing guide 400. The rack routing guide 400 can be mounted to the equipment rack R. As illustrated in FIGS. 10 and 11, the method can further include a step of moving the optical fibers F into a volume defined by a body of the rack routing guide 400 by passing the optical fibers F through an opening in a lateral sidewall of the body. The step of passing the optical fibers F through the opening can result in the first and second components of the body to deflect apart from one another. The operator can pass the optical fibers F past retention features associated with the opening in the lateral sidewall until the optical fibers F are all present in the volume. In certain instances, the optical fibers F are passed through the opening in the rack routing guide 400 individually, i.e., one at a time. In other instances, the optical fibers F can be passed through the opening in the rack routing guide 400 in groups, such as n number at a time (where n is greater than one) or all at once.

Figure 12:
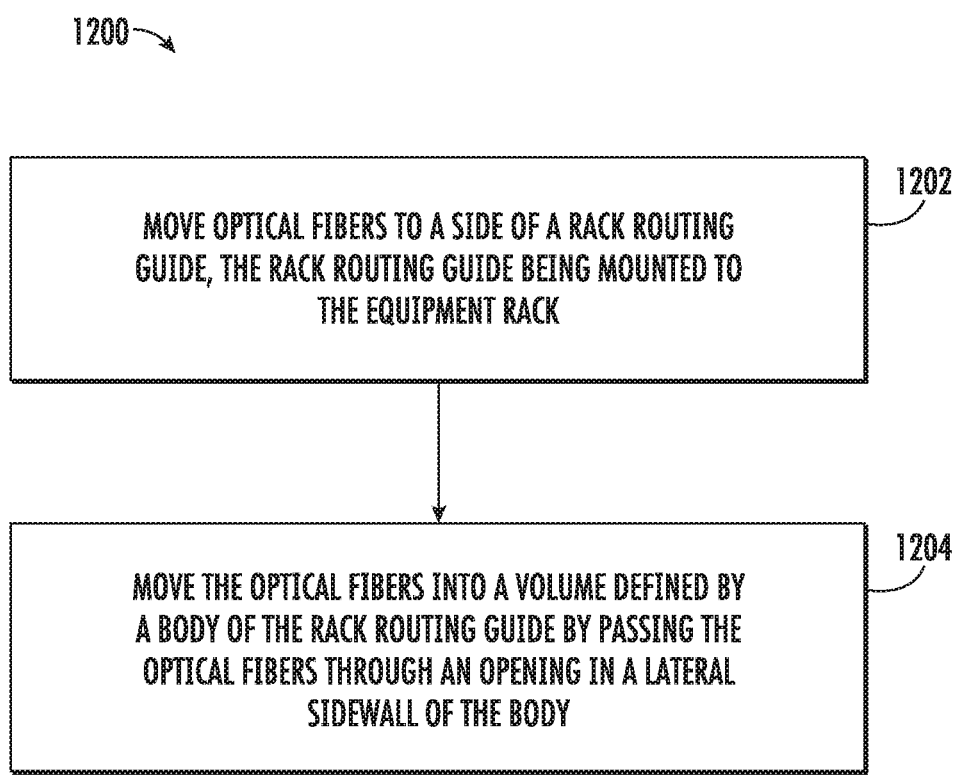
FIG. 12 illustrates a method of routing optical fibers on an equipment rack in accordance with embodiments of the present disclosure.

FIG. 12 is a flow chart of a method 1200 of routing optical fibers F on an equipment rack E. The method includes a step 1202 of moving optical fibers to a side of a rack routing guide, the rack routing guide being mounted to the equipment rack. The method includes a step 1204 of moving the optical fibers into a volume defined by a body of the rack routing guide by passing the optical fibers through an opening in a lateral sidewall of the body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rack routing guide installable in an equipment rack, the rack routing guide comprising:
    a body defining a volume configured to route one or more optical fibers from fiber optic equipment disposed in the equipment rack, wherein a lateral sidewall of the body includes an opening through which the one or more optical fibers are receivable into the volume, wherein the body comprises a first component and a second component, and wherein the first and second components are configured to be disposed adjacent to one another such that the opening in the lateral wall of the body is defined by an interface between the first and second components; and
    a mount configured to statically couple the body to the equipment rack.

2. The rack routing guide of claim 1, wherein the opening comprises one or more retention features configured to retain the one or more optical fibers within the volume.

3. The rack routing guide of claim 1, wherein the opening has an undulating profile.

4. The rack routing guide of claim 1, wherein the body defines an entrance to the volume and an exit to the volume, the entrance and exit being spaced apart from one another.

5. The rack routing guide of claim 4, wherein the opening in the lateral wall of the body extends continuously between the entrance and the exit to the volume.

6. The rack routing guide of claim 4, wherein the entrance and exit are disposed on adjacent sidewalls of the body.

7. The rack routing guide of claim 1, wherein the one or more optical fibers configured to be received by the rack routing guide are configured to float relative to the rack routing guide.

8. The rack routing guide of claim 1, wherein the rack routing guide is configured to remain stationary with respect to the equipment rack when the fiber optic equipment is moved relative to the equipment rack.

9. A rack routing guide system comprising:
a first rack routing guide comprising a body configured to route one or more optical fibers from a first fiber optic module disposed at a first elevation; and
a second rack routing guide comprising a body configured to route one or more optical fibers from a second fiber optic module disposed at a second elevation different from the first elevation,
wherein the first and second rack routing guides are stacked on top of one another, wherein the rack routing guide system is installable on an equipment rack, wherein the first and second fiber optic modules are displaceable relative to the equipment rack, and wherein the first rack routing guide remains at a relatively fixed position with respect to the equipment rack when the first fiber optic module is displaced.

10. The rack routing guide system of claim 9, wherein the body of the first rack routing guide comprises a first component and a second component, and wherein the first and second components are configured to be disposed adjacent to one another such that an opening in a lateral wall of the body is defined by an interface between the first and second components.

11. The rack routing guide system of claim 10, wherein the openings of the first and second rack routing guides have undulating shapes.

12. The rack routing guide system of claim 10, wherein the body of at least one of the first and second rack routing guides defines an entrance to a volume in the body and an exit to the volume, the entrance and exit being spaced apart from one another, wherein the opening in the lateral wall of the body extends continuously between the entrance and the exit to the volume, and wherein the entrance and exit are disposed on adjacent sidewalls of the body.

13. The rack routing guide system of claim 12, wherein the entrance defines a width greater than a dimension of the one or more optical fibers configured to be routed by the rack routing guide.

14. The rack routing guide system of claim 9, further comprising a third rack routing guide comprising a body configured to route one or more optical fibers from fiber optic equipment disposed at a third elevation different from the first and second elevations, wherein the third rack routing guide is stacked with the first and second rack routing guides.

15. The rack routing guide system of claim 9, wherein the first and second rack routing guides are configured to be coupled to the equipment rack through a mount.

16. A rack routing guide system comprising:
a rack routing guide comprising a body configured to route one or more optical fibers from a fiber optic module to a location spaced apart from the fiber optic module, the fiber optic module being slidably disposed in an equipment rack, wherein the rack routing guide is coupled to the equipment rack, and wherein the rack routing guide is configured to remain at a relatively fixed location with respect to the equipment rack when the fiber optic module is slid relative to the equipment rack, wherein the rack routing guide is coupled to the equipment rack through an intermediate member, and wherein the rack routing guide is removable from the intermediate member while the intermediate member remains coupled with the equipment rack.

17. The rack routing guide system of claim 16, wherein the rack routing guide comprises an upper portion and a lower portion spaced apart from one another by a slit, wherein the upper portion and lower portion define an internal volume configured to receive the one or more optical fibers, wherein the internal volume is in open communication with the slit, and wherein the one or more optical fibers are installable in the internal volume by translating the one or more optical fibers transversely through the split.

18. The rack routing guide system of claim 16, further comprising a second rack routing guide configured to route one or more optical fibers from a second fiber optic module to the location spaced apart from the second fiber optic module, the second fiber optic module being slidably disposed on the equipment rack, wherein the second rack routing guide is coupled to the equipment rack, and wherein the second rack routing guide is configured to remain at a relatively fixed location with respect to the equipment rack when the second fiber optic module is slid relative to the equipment rack.

* * * * *